Oct. 15, 1929.                G. A. PERRY                 1,731,724
                              TAPER TURNER
                          Filed Aug. 21, 1925         3 Sheets-Sheet 1
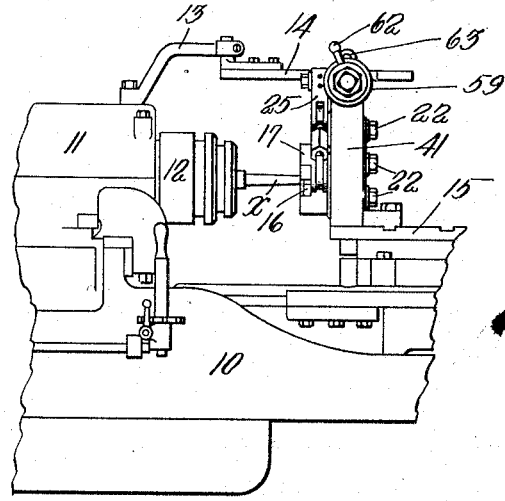
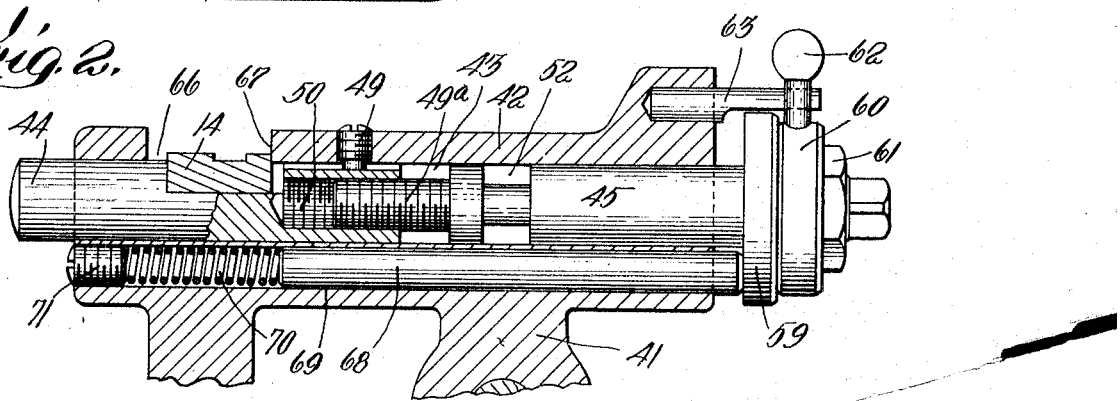
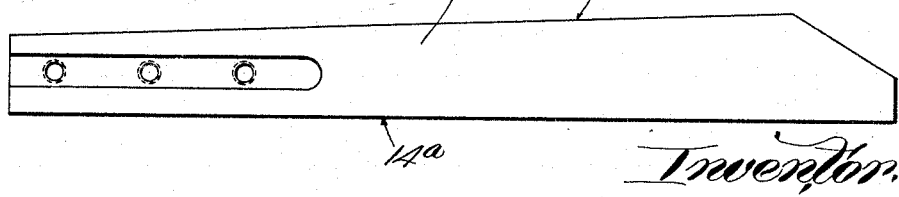

Oct. 15, 1929.  G. A. PERRY  1,731,724
TAPER TURNER
Filed Aug. 21, 1925  3 Sheets-Sheet 2

Inventor
George A. Perry

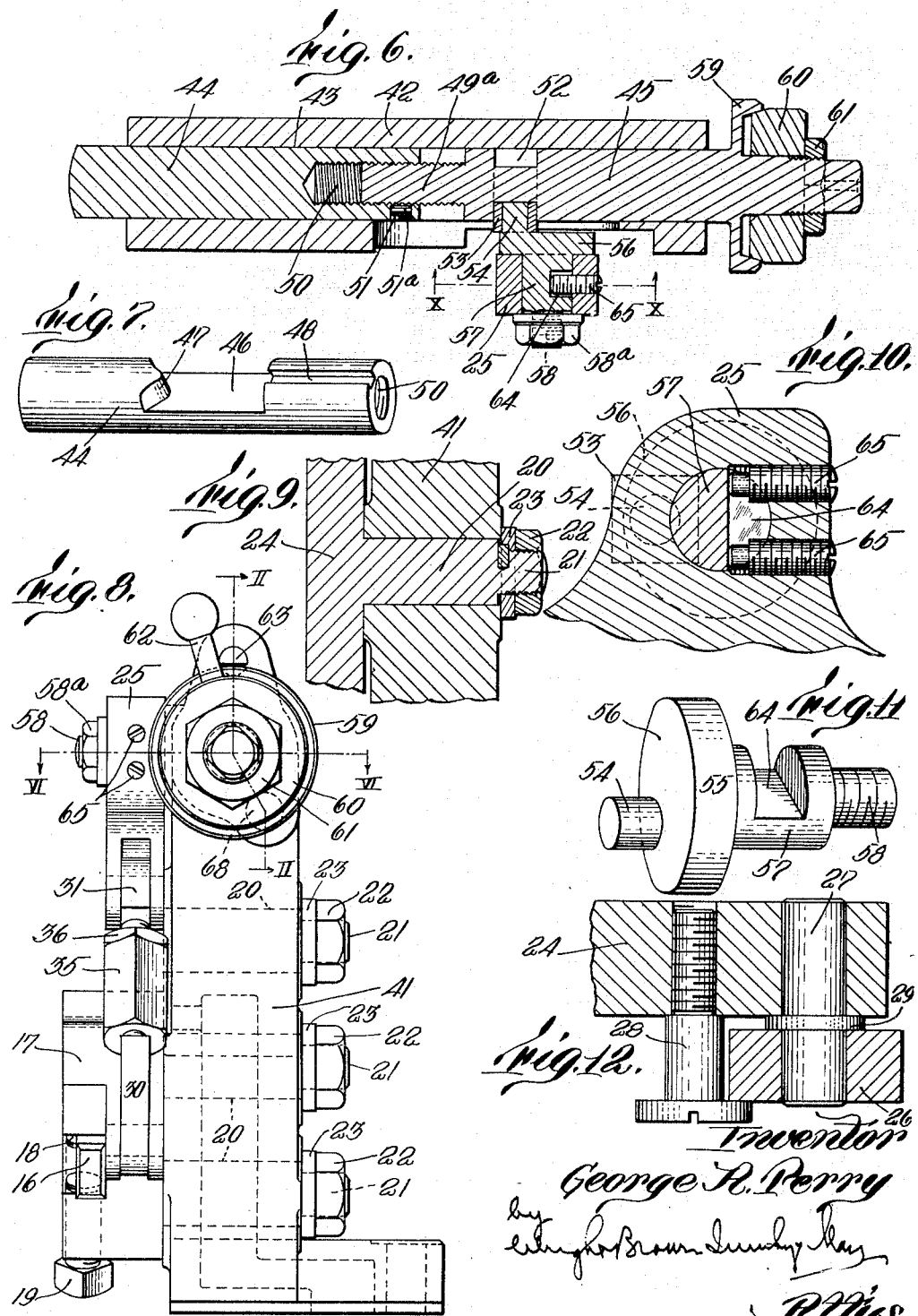

Patented Oct. 15, 1929

1,731,724

UNITED STATES PATENT OFFICE

GEORGE A. PERRY, OF SPRINGFIELD, VERMONT, ASSIGNOR TO JONES & LAMSON MACHINE COMPANY, OF SPRINGFIELD, VERMONT, A CORPORATION OF VERMONT

TAPER TURNER

Application filed August 21, 1925. Serial No. 51,634.

My invention relates to improvements in taper turners, the objects of the invention being to provide a compact tapering device for operation with a template which can be adjusted to different diameters of work without disturbing the template and which is adjustable to overcome slight errors in the taper of the template. The latter result is accomplished through a connecting part which is adjustable to vary the extent of transverse motion of the tool produced by the template through the longitudinal travel of the tool carriage. Thus the taper cut on the work which is normally equal to that of the template may be varied so as to be slightly greater or less than that of the template. This adjustment is also useful for overcoming any slight error in amount of taper which may be due to the machine itself.

In cutting a taper, the tool follows a path with respect to the work which is the resultant of its motion lengthwise of the work with the carriage and its transverse motion produced by the template and the connecting parts through the motion of the carriage. The amount of taper cut depends on the relative lengths of these components of the path of the tool and since the two motions are mechanically related the taper will thus depend on the speed relation in the two component directions. For a given travel of the carriage it is also obvious that the pitch of the taper will be proportional to the amplitude of transverse motion or "throw" of the tool. These relations are determined by the taper of the template and the proportions of the mechanism parts by which this template is caused to move the tool. They are also independent of the distance of the tool from the axis of the work at either end of the travel of the carriage. A change of template or an adjustment of the taper-adjusting member hereinafter described will alter the amplitude or pitch of the path of the tool. By another separate and distinct adjustment the path of the tool may be set in towards or out from the axis of the work without disturbing its amplitude or pitch.

Another object of my invention is to supply a taper turner in which the tool and work supports are separately mounted but so linked together as to have equal radial motion relative to the turning axis of the material. These work supports are carried along on the same carriage with the tool and are kept in substantial transverse alinement so as to be directly opposed to the tool in all positions of the latter and to support the work against the thrust of the tool at that portion of the work which receives the thrust.

Other advantages and combinations will be apparent from the description of a preferred embodiment of the invention shown in the drawings, as follows:

Fig. 1 shows the manner of mounting my taper turner on an automatic lathe.

Fig. 2 is a section on line II—II of Fig. 8 showing the parts for diameter adjustment.

Fig. 5 is a typical taper template, on a larger scale.

Fig. 6 is a horizontal section on line VI—VI of Fig. 8.

Fig. 7 is a perspective view of the template follower slide.

Fig. 8 is an end view of the mechanism shown in Figs. 3 and 4.

Fig. 9 is a detail section on line IX—IX of Fig. 4.

Fig. 10 is a detail section on line X—X of Fig. 6.

Fig. 11 is a perspective view of the taper-adjusting stud.

Fig. 12 is a detail section on line XII—XII of Fig. 4.

Figs. 10, 11 and 12 are shown on an enlarged scale.

Figure 3:
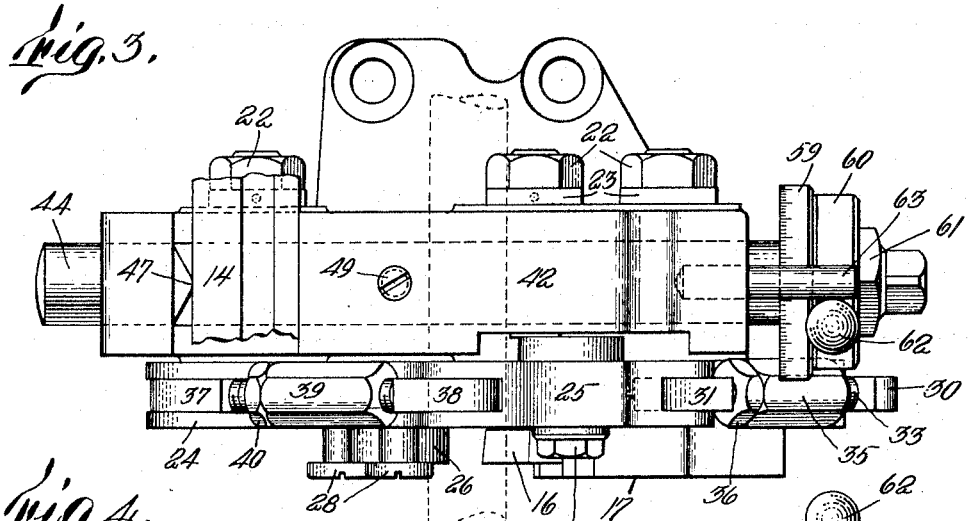
Fig. 3 is a plan view of the mechanism associated with the template.

A portion of a lathe is shown in Fig. 1, the bed of which is indicated at 10. Head stock 11 supports a chuck spindle 12, by which the work X is carried. A bracket 13 is mounted on the headstock and to it is secured a template 14. This template cooperates with the moving tool carriage which is indicated generally by 15, and is preferably formed with one edge 14$^a$, arranged to be parallel to the work when the template is in position, the other edge 14^b being shaped to act as a cam surface.

Referring more particularly to Figs. 3, 4 and 8, 16 represents a cutting tool adjustably mounted on a tool holder 17 by set screws 18 and 19. Shown as integral with the tool holder is a stud 20 which has a reduced threaded end 21, which, with a nut 22, secures the tool holder to a member 41 secured to the tool carriage 15. Between the nut 22 and the tool carriage, a washer 23 is keyed to the stud 20, permitting the tool holder to rock on the member 41 without loosening the nut 22. The tool holder 17 is thus essentially a lever fulcrumed at 20 on the member 41. This construction, shown in more detail in Fig. 9, permits the tool to move transversely of the axis of the work through a rocking of the tool holder so that the motion of the cutting edge of the tool relative to the carriage is substantially radial of the axis of the work.

Fulcrumed on the tool carriage in a manner similar to that described above for tool holder 17 are levers 24 and 25. Each lever carries at one end a roller 26 loosely mounted on a pin 27 and held in place by a retaining screw 28. The pin is provided with a collar 29 which keeps the roller 26 in spaced relation to its lever. The rollers and the tool are arranged so as to be substantially in a common plane perpendicular to the work and so spaced about the work as to take directly the thrust of the tool against the work, thus preventing a bowing or springing of the work from the thrust of the tool operating thereon. Since the rollers and tool are all carried by the tool carriage, this opposed relation will be maintained at all times.

Tool holder 17 is linked to lever 25 by means of a turn buckle composed of end members 30 and 31 pivoted respectively to the tool member 17 and to the lever 25 by pins 32. These members have threaded portions 33, 34 with right and left hand screw threads respectively, entering a turn buckle nut 35, which is retained in position by a lock nut 36. The member 30 is so shaped as to permit the nuts 35 and 36 to be turned without interfering with the tool holder 17. The lever 24 is linked with the lever 25 by another turn buckle, consisting of members 37, 38, having ends screw-threaded into a turn buckle nut 39, which is locked by a nut 40. As will be seen from Fig. 4, these turn buckles link together the two levers and the tool holder in such a way that any motion imparted to one of the three will be transmitted to the other two. It will also be seen that the rocking axes of these members are so located with respect to the work and the lever arms are of such a length that the rollers 26 and the cutting edge of tool 16 will all bear on the periphery of the work and will move together equally toward or from the axis of rotation of the work.

The member 41 is irregularly shaped, the lower part being generally flat in form with unnecessary portions cut away to lighten the weight of the member. The upper portion, indicated as 42, resembles in shape a hollow cylinder. Fitted into the bore 43 of this upper portion is a slide or plunger consisting chiefly of two parts or sections 44 and 45. As shown in Fig. 7, the part 44 has a cut away portion 46, at one end of which is a rounded surface 47 adapted for engagement with one edge of the template 14, as shown in Fig. 3. The template as previously mentioned is fixed to the head stock. A longitudinal slot 48 is cut in the top of member 44, and a set screw 49 extending through the wall of member 42 rides in this slot 48 to prevent rotation of the slide part 44.

The slide member 45 is extensibly connected with the slide member 44 by any preferred means. Herein it is shown as having a reduced portion 49^a threaded into an aperture 50 of the slide 44 and secured in adjusted position therein by a set screw 51, bearing against a slidable plug 51^a. The slide member 45 is also provided with a peripheral groove 52, in which rides a shoe 53 rotatably carried by stud 54 of the member 55.

As will be seen from Fig. 6, this member serves as a connection between the lever 25 and the slides 44, 45, so that any axial motion of member 45 will produce simultaneous rocking of levers 24 and 25 and tool holder 17. The initial position of the levers and tool holder is determined by the position of slide part 45 relative to the slide part 44. This relation is adjusted by turning the slide part 45 axially, since slide part 44 is restrained from rotation by the set screw 49. A flange 59 is formed near the outer end of slide part 45 and has a cylindrical surface on which a scale is marked. A cylindrical member 60 is held in binding adjustable engagement with member 59 by nut 61 and has fixed thereto a handle 62, by which turning of the slide part 45 may be effected. A post 63 is fixed in the tool carriage in a position to provide a line of reference for the scale on member 59. The post 63 also serves as a stop for handle 62. Any desired setting of the slide 45 having been obtained, the member 60 can thereupon be adjusted to bring handle 62 against the post 63. The slide part 45 may thereafter be instantly brought back to that adjusted position by turning the handle back to its position against the post, and may be fixed in position by setting up on the set screw 51.

The taper adjusting member, as shown in Fig. 11, consists of a disc 56 having formed integrally therewith on one side a concentric stud 57 journaled in an end of the lever 25, and on the other side an eccentric stud 54. This member is secured to the lever by the nut 58^a threaded on a reduced end 58 of the stud 57 and is so constructed and mounted that the virtual length of the lever arm of lever 25 from its axis to the point of connection with slide 45 may be varied. A portion of stud 57 is cut away to form a slot 64. Into this slot set screws 65 extend, these set screws being tapped through a portion of the lever 25. As seen in Fig. 10, an adjustment of the member 55 will result in a raising or lowering of the eccentrically mounted stud 54 and the shoe 53 thereon. Since the shoe 53 provides the connection between slide 45 and lever 25, a displacement of this shoe with respect to the rocking axis of the lever 25 will alter the virtual length of the lever arm, as previously mentioned. By backing off one of the screws 63 and setting up on the other, it will readily be seen that the angular relation of the taper-adjusting member to the lever 25 can be nicely adjusted. The parts are so proportioned that the various lever arms are of such a length as to reproduce on the work the exact taper of the template when the taper-adjusting member 55 is set so as to locate the axes of the studs 54 and 58 at equal distances from the rocking axis of the lever 25. This may be called the normal position of the taper-adjusting member. It is obvious, however, that the various lever arms might be so proportioned as to cause the tool to cut a taper on the work bearing any desired ratio to the taper of the template.

Figure 4:
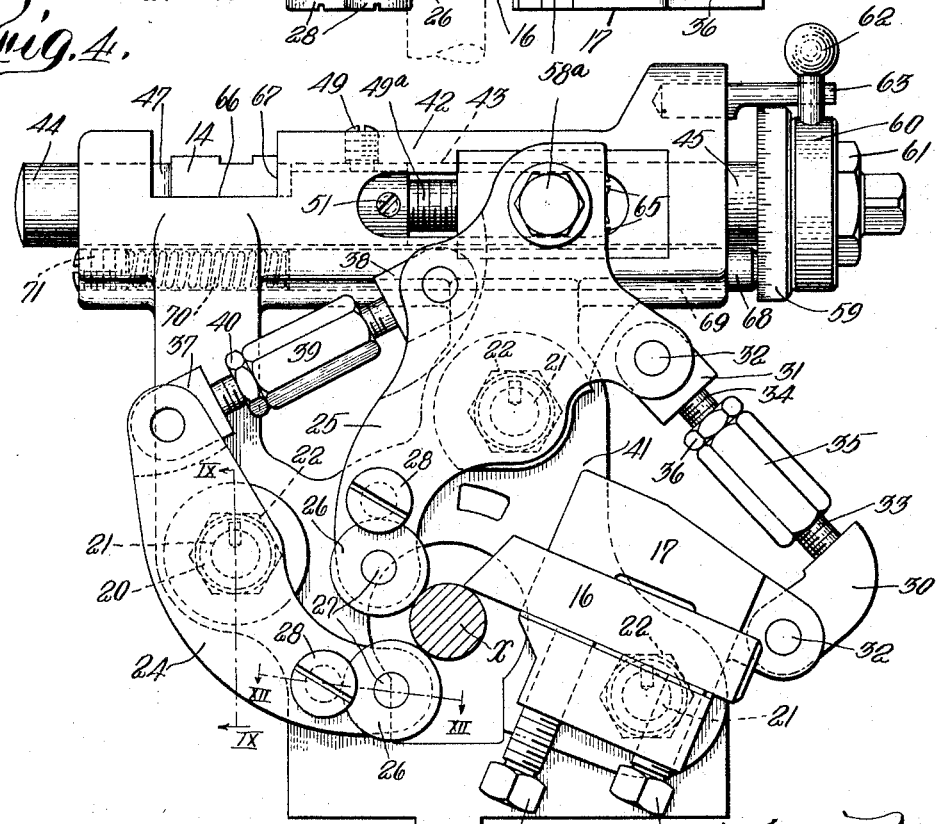
Fig. 4 is a side elevation of the same.

A slot 66 is provided in the member 42 communicating with bore 43. This slot also registers with the cut away portion of the slide part 44. As shown in Fig. 4, the parts are so arranged that the template 14 is received in the slot 66 and engages the surface 47 of the slide part 44 on one side and the surface 67 of the slot 66 on the other side. Sliding in another bore 69 in the member 42 and parallel to slides 44, 45, is a plunger 68 behind which is a spring 70 pressing it against the flange 59. The spring 70 seats against a set screw 71. The plunger tends to keep the engaging surface 47 of the slide part 44 in contact with the cam surface 14$^b$ of the template 14. Since the template is fixed on the lathe, a motion of the carriage relative thereto will cause the template to slide in the slot 66. If the template is tapered, as shown in Fig. 5, the change of its width in the slot will force the slide 44 to the left or permit it to move to the right. This motion will be transmitted to slide 45 and through the adjustable member 55 to the roll carrying levers 24, 25 and the tool holder 17. It will be seen that if the member 55 is adjusted so as to increase the length of its adjacent lever arm, a given template will produce a smaller angle of rocking in the lever 25 and consequently a smaller throw of the tool 16 transversely of the work. It will thus be seen that the taper produced on the work may be changed independently of the template. This allows small errors in the amount of taper of the template to be overcome or corrected without the necessity of reshaping the template.

It will be understood that variations and modifications can be made in the construction illustrated and described above without departing from the spirit and scope of the invention.

What I claim is:

1. In a metal-working machine, a carriage traversable lengthwise of the work, a tool operating on one side of the work, a pair of spaced members in substantially transverse alinement to take the thrust of the tool on the work, said supporting members comprising a pair of levers each having means on one end to engage the work, a third lever adapted to hold the tool, all three levers being fulcrumed on the carriage, and means actuated to move the tool and work-engaging means from and toward the work including means operatively connecting the three levers in a manner to keep the tool and work-engaging means substantially equidistant from the axis of the work in all their positions.

2. In a metal-working machine, a template, a tool carriage movable relatively thereto and provided with a surface against which one edge of the template is adapted to bear, a tool mounted on the carriage for motion transverse to the axis of the work, a slide carried by said carriage and having a surface against which the opposite edge of the template is adapted to bear to impart motion to the slide relative to the carriage during the travel thereof, and means operatively connecting the slide with the tool including a lever mounted on the carriage and means adjustable to vary the amplitude of the transverse motion of the tool.

3. In a metal-working machine, a template, a tool carriage movable relatively thereto and provided with a surface against which one edge of the template is adapted to bear, a tool mounted on the carriage for motion transverse to the axis of the work, a slide carried by said carriage and having a surface against which the opposite edge of the template is adapted to bear to impart motion to the slide relative to the carriage during the travel thereof, and means operatively connecting the slide with the tool including a lever mounted on the carriage and means carried by the lever adjustable to vary the amplitude of the transverse motion of the tool.

4. In a metal-turning machine, a template, a carriage movable with respect to the template, a tool holder pivotally mounted on the carriage and carrying a tool, levers fulcrumed on the carriage and linked to the tool holder, rollers on the levers for engaging the work to support the work against the thrust of the tool, and means on the carriage cooperating with the template during the motion of the carriage to rock the levers and tool holder to vary equally the distance of the rollers and tool from the axis of the work.

5. In a metal-working machine, the combination with a template, a carriage movable relatively to the template, and a tool having a cutting edge rockably mounted for motion transverse to the axis of the work, of means carried by the carriage and cooperating with the template to control the transverse motion of the cutting edge, said means including mechanism adjustable to modify the effect of the template upon the transverse motion of the cutting edge.

6. In a taper-turner, a template, a carriage movable relatively thereto and lengthwise of the work, a tool adapted to operate on the work, and means carried by the carriage and controlled by the template to move the cutting edge of the tool toward and from the axis of the work during the travel of the carriage, said means including a lever carrying the tool, a second lever carrying a work-supporting member and linked to said tool-carrying lever, and adjustable means carried by one of said levers and engaging said slide whereby to vary the virtual length of its lever arm and thus to vary the throw of the tool.

7. In a taper-turner, a template, a carriage movable relatively thereto and lengthwise of the work, a tool for operating on the work, and means actuated by the travel of the carriage for moving the tool toward and from the axis of the work, said means being controlled by the template and comprising an extensible sectional slide, one section engaging the template and extensibly secured to another section, a lever for actuating the tool and having a connecting member engaging said other section of the slide, means for adjusting the relative positions of said slide sections to adjust the initial position of the tool, and means for adjusting said connecting member to vary the throw of the tool.

8. In a taper-turner, a template, a carriage movable relatively thereto and longitudinally of the work, a tool for operating on the work, and means actuated by the travel of the carriage and carried thereby for moving the tool toward and from the axis of the work, said means being controlled by the template and comprising an extensible sectioned slide, one section engaging the template and extensibly secured to another section, a lever holding the tool, a second lever linked to the tool holder, a connecting member carried by one of said levers and engaging said other section, means for adjusting the relative positions of the sections to adjust the initial position of the tool, and means for adjusting said connecting member to vary the throw of the tool.

9. In a taper-turner, a template, a carriage movable relatively thereto and longitudinally of the work, a tool for operating on the work, and means controlled by the template and actuated by the travel of the carriage for moving the tool toward and from the axis of the work, said means being carried by the carriage and comprising a slide engaging the template and having a recess, and mechanism operatively connecting the slide with the tool including a lever and a member adjustably mounted on said lever to vary the virtual length of the lever and the throw of the tool, said member comprising a disc, a stud eccentrically mounted on the disc, and a shoe rotatably mounted on the stud, said shoe engaging in said recess.

10. In a taper-turner, a template, a carriage movable relatively thereto and longitudinally of the work, a tool for operating on the work, and means controlled by the template and actuated by the travel of the carriage for moving the tool toward and from the axis of the work, said means being carried by the carriage and comprising a non-rotatable slide part engaging the template, a rotatable slide part having a peripheral groove, said grooved slide being axially alined with the template-engaging slide and having a portion threaded therein for longitudinal adjustment relative thereto, and mechanism operatively connecting the grooved slide with the tool including a lever and a member adjustably mounted on said lever to vary the virtual length of the lever and thereby to vary the throw of the tool, said member comprising a disc, a stud eccentrically mounted on the disc, and a shoe rotatably mounted on the stud, said shoe engaging in said groove.

11. In a taper-turner, a tool for operating on the work and having a cutting edge, and means for imparting to the cutting edge simultaneous motions longitudinal and radial of the axis of the work, said means comprising mechanism for controlling the speed relation of the longitudinal and radial motions, and a device independent of said mechanism for modifying the controlling action thereof.

12. In a taper-turner, a template of fixed configuration extending longitudinally of the work, a carriage movable longitudinally of the work and template and relatively thereto, a tool mounted on said carriage for motion transversely of the axis of the work, and means co-operating with and controlled by the template for imparting transverse motion to the tool during the longitudinal motion of the tool and carriage, said means including a device for modifying the control of the template.

13. In a taper-turner, a tool for operating on the work, and means for imparting to the tool simultaneous motions longitudinal and transverse of the axis of the work, said means comprising a member having a cam surface for controlling the speed relation of the longitudinal and transverse motions, and a mechanism independent of the cam member adjustable to alter the action of the member in a manner to produce a speed relation normally corresponding to a different cam surface.

14. In a taper-turner, a tool for operating on the work, and means for imparting to the tool motions longitudinal and transverse of the axis of the work, said means comprising a tapered template, and mechanism cooperating with the template for controlling the transverse motion of the tool during its longitudinal travel in a manner to cut on the work a taper equal to the taper of the template, said mechanism including a device adjustable to vary the taper cut on the work from that of the template.

15. In a metal-working machine, a template, a tool, and mechanism for controlling the position of the tool by the template including means independent of the template adjustable to modify the amplitude of the path of motion of the tool produced by the template and adjustable to determine the location of said path.

16. In a metal-working machine, a template, a carriage movable lengthwise of the template, a tool carried by the carriage and movable relatively thereto transversely of the axis of the work, and means for controlling the transverse motions of the tool, including means independent of the template adjustable in one way to modify the amplitude of the transverse motion and adjustable in another way to determine the spacing of said path from the axis of the work.

17. In a metal-working machine, a tool movable between limiting positions toward and from the axis of the work, a template for controlling said motion, and means independent of the template adjustable in one way to alter said limiting positions relatively to each other and adjustable in another way to alter said limiting positions with respect to the axis of the work.

In testimony whereof I have affixed my signature.

GEORGE A. PERRY.